United States Patent [19]
Henecka et al.

[11] 3,876,644
[45] Apr. 8, 1975

[54] PROCESS FOR THE PRODUCTION OF 6,7-BENZOMORPHANES

[75] Inventors: Hans Henecka; Hans Werner Schubert, both of Wuppertal-Elberfeld, Germany

[73] Assignee: Bayer Aktiengesellschaft, Leverkusen, Germany

[22] Filed: June 21, 1966

[21] Appl. No.: 559,079

[30] Foreign Application Priority Data
June 25, 1965 Germany.............................. 46439

[52] U.S. Cl.......................... 260/293.54; 260/293.9
[51] Int. Cl............................................ C07d 39/00
[58] Field of Search... 260/294.7, DIG. 13, 294.7 B, 260/294.3 A, 293.54

*Primary Examiner*—Henry R. Wiles
*Assistant Examiner*—Robert T. Bond

[57] ABSTRACT

Analgetic 6,7-benzomorphan derivatives are made by a new process from derivatives of N-alkyl-2-benzyl-4-hydroxy-piperidines. Typical products and the processes by which they are produced are 5-ethyl-2'-hydroxy-2,9-dimethyl-6,7-benzomorphan by heating 4-ethyl-4-hydroxy-2-(4'-methoxybenzyl)-1,3-dimethyl-piperidine with hydrobromic acid and 2,5,9-trimethyl-2'-hydroxy-6,7-benzomorphan by heating 1,3,4-trimethyl-4-hydroxy-2-(4'-methoxybenzyl)-piperidine with hydrobromic acid. When hydrobromic acid is used, it is 48 percent concentration, but other strong acids may be used and when racemic products are produced, they are subsequently optically resolved into their active isomers.

1 Claim, No Drawings

PROCESS FOR THE PRODUCTION OF 6,7-BENZOMORPHANES

The present invention relates to analgetic 6,7-benzomorphan derivatives and more particularly to a new and technically effective process for their production from derivatives of N-alkyl-2-benzyl-4-hydroxypiperidines.

Benzomorphan derivatives such as 2'-hydroxy-N-methyl-5,9-dimethyl-6,7-benzomorphan have proved to be strongly active analgetics. Hitherto, the procedure for the preparation of these benzomorphan derivatives has consisted of subjecting 2-p-methoxybenzyl-3,4-dialkyl-N-methyl-1,2,5,6-tetrahydropyridines, available from 3,4-dialkylpyridines by various methods, to the action of strong acids [J. Org. Chem. 22, 1366 (1957); U.S. Pat. No. 3,138,603; Japanese Pat. No. f 30,172/64 (Derwent Basic Pat. No. 15,323)]. The fact that 3,4-disubstituted pyridines are only available with difficulty and that some of the intermediate products employed during stages in these syntheses are highly unstable has in the past rendered difficult the production of derivatives of -6,7-benzomorphanes on a technical or commercial scale.

It has now been found in accordance with the present invention that derivatives of N-alkyl-2-benzyl-4-hydroxypiperidines of the formula I:

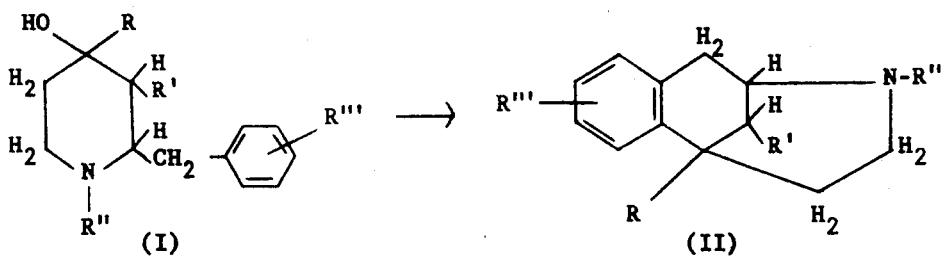

wherein
R is alkyl, aryl or aralkyl,
R' is hydrogen, alkyl, aryl or aralkyl,
R'' is alkyl and
R''' is hydrogen, hydroxyl, alkoxy, alkyl, halogen, amino or substituted amino, are efficiently and readily converted to 6,7-benzomorphanes of the formula II, wherein R, R', R'' and R''' have the above-mentioned significance, by the action of strong acids, while avoiding the difficulties of prior processes.

Due to the process of the present invention, these therapeutically important 6,7-benzomorphan analgetics have become compounds which are readily available on a technical scale, since their preparation now no longer depends on 3,4-disubstituted pyridines which are only available with difficulty. A wide variety of the derivatives of N-alkyl-2-benzyl-4-hydroxypiperidines employed according to the invention as the preliminary stages for their cyclization to form 6,7-benzomorphanes has become readily available β-γ-unsaturated nitriles.

It has been found that derivatives of 4-hydroxypiperidine of the general formula (I'):

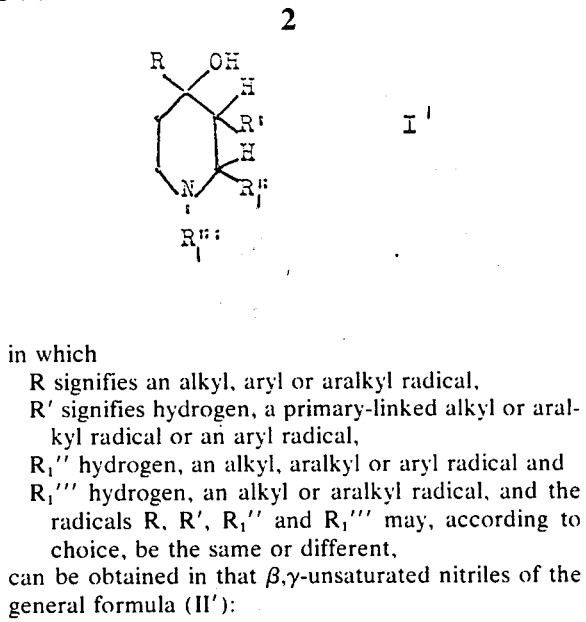

in which
R signifies an alkyl, aryl or aralkyl radical,
R' signifies hydrogen, a primary-linked alkyl or aralkyl radical or an aryl radical,
$R_1''$ hydrogen, an alkyl, aralkyl or aryl radical and
$R_1'''$ hydrogen, an alkyl or aralkyl radical, and the radicals R, R', $R_1''$ and $R_1'''$ may, according to choice, be the same or different,
can be obtained in that β,γ-unsaturated nitriles of the general formula (II'):

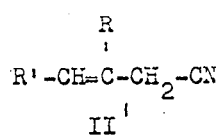

are partially hydrogenated to γ,δ-unsaturated amines of the general formula (III'):

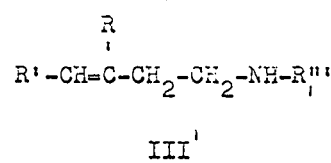

and the amines (III') so obtained condensed in acidic solution with aldehydes $R_1'''$.CHO. R, R', R'' and $R_1'''$ have the above-given meaning.

As starting materials, there are used β,γ-unsaturated nitriles of the general formula (II'), such as are obtained, for example, by the condensation of ketones of the general constitution R'.CH$_2$.CO.R with cyanoacetic acid in admixture with the isomeric α,β-unsaturated nitriles (IV') and with which they stand in an acid-base catalysed tautomeric equilibrium:

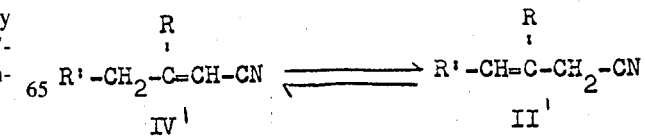

R and R' have the above-given meaning.

In this tautomeric equilibrium, a second $\beta,\gamma$-unsaturated form can occur if R is alkyl or aralkyl.

Apart from the solvate system, the position of this equilibrium is, furthermore, substantially dependent upon the substituents R and R'.

The $\alpha,\beta$- and $\beta,\gamma$-unsaturated nitriles can also be obtained by other known methods, such as by substitution of the halogen in corresponding $\omega$-halo-olefins by the cyano group.

It is, however, not necesary to separate the $\beta,\gamma$-unsaturated nitriles required as starting material according to the invention from such an equilibrium mixture of the $\alpha,\beta$- and $\beta,\gamma$-unsaturated nitriles since, as has been found, only the former can be partially hydrogenated catalytically to $\gamma,\delta$-unsaturated amines (III); from the admixed $\alpha,\beta$-unsaturated nitriles there result by the hydrogenation only saturated amines which do not interfere with the course of the further reaction.

The first step of the synthesis consists in the partial reduction of the $\beta,\gamma$-unsaturated nitriles to $\gamma,\delta$-unsaturated amines. This reduction is preferably carried out with catalytically activated hydrogen in alcoholic solution with the use of Raney catalysts, especially Raney nickel or Raney cobalt. Since only the cyano group is to be partially hydrogenated, with the maintenance of the double bond, it is expedient to work at room temperature or at an only slightly increased temperature, e.g. at 50°–70°C. The more detailed conditions of the hydrogenation depend essentially on the activity of the catalyst, but the object according to the invention is best achieved with catalysts of average activity. It is, therefore, recommended to partially de-activate highly active catalysts by the usual methods, e.g. by the addition of ferrous sulphate. Suitable solvents are lower alcohols, such as methanol or ethanol; with equally good results, however, also hydrocarbons can be used, such as benzene, toluene, cyclohexane, or ethers, such as e.g. tetrahydrofuran or dioxan and the like. If the preparation of primary amines is intended, then it is also expedient to work with the usual additives, such as ammonia, ammonium acetate, or potassium hydroxide, to avoid the formation of secondary amines.

Instead of the catalytic hydrogenation of the nitriles (II') (or II' + IV') to the amines (III'), any other known method of reduction may be used, which is equivalent to catalytic hydrogenation, such as e.g. the reduction with nascent hydrogen, such as sodium and alcohol, or the reduction with alkali metal or alkaline earth metal alanates or borohydrides in the solvents or diluents usual for this purpose. The $\beta,\gamma$-unsaturated amines resulting from the admixed $\alpha,\beta$-unsaturated nitriles, besides the saturated amines, do not interfere with the further course of the reaction.

The composition of the amine mixtures does not always correspond to the composition of the nitrile mixtures used as starting material since, during the reduction, a displacement of the equilibrium in the nitrile mixture can take place not only due to the alkaline influence of the amine already formed but also by the influence of the reducing agent (e.g. lithium alanate). Thus, for example, it is possible, by choosing suitable reducing agents, to produce the $\gamma,\delta$-unsaturated amines required for the further reaction also from pure $\alpha,\beta$-unsaturated nitriles via their intermediately formed $\Delta^\beta,\gamma$-tautomers.

Instead of the primary amines (III', R''' = H), the corresponding secondary amines (III', $R_1'''$ = alkyl or aralkyl, such as methyl, ethyl, cyclopropylmethyl, allyl, substituted allyl, benzyl, $\beta$-phenylethyl, $\gamma$-phenyl-$\gamma$-ketopropyl,$\gamma$-phenyl-$\gamma$-hydroxypropyl and the like) can also be used for the further reaction according to the invention. These secondary amines (III') are obtained by the usual methods either directly from the nitriles (II') (or II' + IV'), e.g. by hydrogenation in the presence of primary amines $R_1'''.NH_2$ or by alkylation of the primary amines (III', $R_1'''$ = H) initially obtained from the nitriles according to the invention.

The last step of the new synthesis according to the invention, the condensation of the amines (III') with aldehydes $R_1''.CHO$ to the 4-hydroxy-piperidine derivatives (I'), is carried out in acidic aqueous solution at pH 2–4. The experimental conditions of this condensation can vary within wide limits; it is possible to work in a concentrated, about 10–30 percent, solution or, as has generally proved to be advantageous, in an about 0.1–0.2 molar solution, corresponding to a concentration of amine of about 1–5%.

Normally the waterbath temperature is chosen as the reaction temperature, i.e. about 80°–90°C.; with especially reactive aldehydes, such as e.g. formaldehyde, the condensation according to the invention can also be carried out at room temperature or at an only slightly increased temperature, e.g. at 30°–50°C.

The aldehydes employed for the condensation are, in general, used in the free form. Alternatively, however, there can also be used as aldehyde equivalents those compounds which, under the reaction conditions, are gradually converted into the free aldehydes capable of condensation, such as e.g. para-formaldehyde as a source for formaldehyde; paraldehyde for acetaldehyde; or phenyl-glycide esters for phenylacetaldehyde; instead of the free aldehydes, their bisulphite compounds can also be used.

The duration of the reaction depends upon the condensation ability of the aldehydes used or the speed with which the aldehydes are liberated from the equivalent forms used. If working at 80°–90°C., then a complete reaction is already achieved with reactive aldehydes after heating for about 1 hour, but generally after heating for about 12 – 24 hours, whereas with aldehyde equivalent forms which slowly split off or with sterically hindered aldehydes, a prolonged heating e.g. for 2–6 days, may be necessary. When reactive formaldehyde is used, the condensation also takes place by standing for several weeks at room temperature.

As to the relative amount of aldehyde used, the condensation of primary $\gamma,\delta$-unsaturated amines is carried out with the application of the calculated molar amount. If, however, working with formaldehyde, and it is intended to convert the 4-hydroxy-piperidine derivative formed according to the invention into the corresponding N-methyl compound, then formaldehyde can also be used in excess since the N-methylol-4-hydroxy-piperidine derivative which is now formed can easily be reduced to the N-methyl compound.

The maintenance of the pH optimum of pH 2–4 is important for attaining maximum yields of 4-hydroxy-piperidines. If a greater excess of acid is used (pH ~ 1), then an undesirable dehydration of the 4-hydroxy-piperidines to $\Delta^{3,4}$-piperidines may take place.

If the starting materials are substituted by aryl radicals, then these radicals can additionally contain substituents, such as lower alkyl groups, halogen, alkoxy, hydroxy or substituted amino groups; the aryl radicals, moreover, can not only be phenyl, naphthyl and the like, but also heteroaryl, such as pyridyl, thiazolyl and the like. Alkyl substituents of the starting materials can be straight chain or branched, saturated or unsaturated.

The invention is illustrated by the following non-limitative examples.

EXAMPLES OF STARTING MATERIALS

EXAMPLE 1

2-p-methoxybenzyl-3,4-dimethyl-4-hydroxy-piperidine a. 285 g. (3 mol) of a mixture of 3-methyl-$\Delta^{2,3}$-pentenonitrile and 3-methyl-$\Delta^{3,4}$-pentenonitrile (obtained by the condensation of methyl ethyl ketone with cyanoacetic acid; b.p. 156°–157°C.) are dissolved in 1 litre methanol and, after the addition of 30 g. Raney cobalt and 30 ml. of a 0.1 molar aqueous ferrous sulphate solution, hydrogenated at 50° – 70°C. and at a pressure of 50 atmospheres of hydrogen until termination of the hydrogen absorption, i.e. 139 litres hydrogen within 1 hour. After cooling, the catalyst is separated, the solution acidified, while cooling, with 300 ml. concentrated hydrochloric acid and the methanol evaporated from this solution in a vacuum at 50°C. The base is liberated, with strong cooling, from the aqueous solution obtained, by means of a concentrated sodium hydroxide solution, the base is taken up with ether, the ether solution dried over potassium hydroxide and, after evaporation of the ether, the base is distilled:

b.p. 125° – 128°C.; yield 180 g. (60% of theory).

This reduction can also be carried out with lithium alanate:

A solution of 142.5 g. (1.5 mol) of a mixture of 3-methyl-$\Delta^{2,3}$-pentenonitrile and 3-methyl-$\Delta^{3,4}$-pentenonitrile (s. above) in 100 ml anhydrous ether is added dropwise, with stirring, at −10° to −5°C. to 68.5 g. (1.8 mol) lithium alanate in 500 ml. anhydrous ether. The reaction mixture is allowed to warm up slowly to room temperature, stirred at room temperature for a further 12 hours and thereafter decomposed by the dropwise addition of a 20% sodium hydroxide solution. The ether layer is separated, the resultant base shaken out with 5% hydrochloric acid, the base liberated from the clear acidic solution with a concentrated sodium hydroxide solution and isolated with ether in the usual way; b.p. 130° – 132°C.

b. 50 g. (0.5 mol) of the so obtained primary amine (mixture of 3-methyl-pentylamine and 3-methyl-$\Delta^{3,4}$-pentenylamine) are dissolved in 535 ml. 1N hydrochloric acid, the solution diluted with 1965 ml. water (pH ≈ 3) and, after the addition of 104 g. (0.5 mol) p-methoxy-phenyl-glycidic acid methyl ester, heated at 80° – 90°C. for 2 – 3 days, with vigorous stirring. After cooling, resin-like impurities are filtered off, the solution is covered with a small amount of ether and the resultant base separated by the addition of a 50% potassium carbonate solution. After standing for several hours, the condensation product has separated in crystalline form at the separating layer. The product is filtered off with suction and washed with water and a little ice cold ether. In this manner, there are obtained 26.5 g. 2-p-methoxybenzyl-3,4-dimethyl-4-hydroxy-piperidine of m.p. 140° – 141°C.

$C_{15}H_{23}NO_3$ (249):
Calc.: C 72.27; H 9.30; N 5.62; OCH$_3$ 12.45.
Found: C 72.22; H 9.52; N 5.45; OCH$_3$ 12.59.

From the ethereal mother liquor of the first crystallization there is obtained, after distillation of the residue obtained by evaporation of the ether (b.p. 160° – 165°C. 0.01 mm.Hg.), a rapidly solidifying oil; from ether, 3.5 g., m.p. 134° – 136°C., which is probably a stereomer of the form first obtained.

$C_{15}H_{23}NO_3$ (249):
Calc.: C 72.27; H 9.30; N 5.62.
Found: C 72.50; H 9.25; N 5.69.

Total yield 30 g.; since the starting amine only contained about 50% 3-methyl-$\Delta^{3,4}$-pentenylamine, the theoretical yield amounts to about 50 % of theory.

If the p-methoxyphenylglycide methyl ester is replaced by the equimolar amount of benzaldehyde and the procedure is otherwise the same as that described under (b), then there is obtained 2-phenyl-3,4-dimethyl-4-hydroxy-piperidine of m.p. 165° – 167°C.

$C_{13}H_{19}NO$ (205):
Calc.: C 76.04; H 9.33; N 6.82.
Found: C 76.18; H 9.22; N 6.90.

By replacing the benzaldehyde by the equimolar amount of freshly distilled isobutyraldehyde, there is obtained, analogously, 2-isopropyl-3,4-dimethyl-4-hydroxy-piperidine of m.p. 118° – 120°C.

$C_{10}H_{21}NO$ (171):
Calc.: C 70.11; H 12.36; N 8.18.
Found: C 70.10; H 11.88; N 8.23.

EXAMPLE 2

3-methyl-4-phenyl-4-hydroxy-piperidine.

a. 78.5 g. (0.5 mol) 3-phenyl-$\Delta^{3,4}$-pentenonitrile (prepared by the condensation of propiophenone with cyanoacetic acid; b.p. 115°C./7 mm.Hg.; it exclusively contains the β,γ-unsaturated nitrile) are dissolved in 200 ml. methanol and, after the addition of 10 g. Raney cobalt and 10 ml. of a 0.1 molar aqueous ferrous sulphate solution, hydrogenated at 70°C. and at a pressure of 50 atmospheres of hydrogen until the absorption of hydrogen is completed, i.e. 19.7 litres hydrogen within 1 hour. After cooling, the catalyst is filtered off with suction, the methanol evaporated from the solution in a vacuum and the residue distilled in a vacuum; b.p. 96° – 98°C./9 mm.Hg.; 3-phenyl-$\Delta^{3,4}$-pentenylamine; yield 58.7 g., i.e. 73% of theory.

b. 80.5 g. (0.5 mol) 3-phenyl-$\Delta^{3,4}$-pentenylamine are dissolved in 545 ml. 1N hydrochloric acid, diluted with 2000 ml. water and, after the addition of 50 g. of a 30% formalin solution, stirred for 40 hours at 80° – 90°C. pH of the solution is 3.0; concentration about 0.2 molar. After cooling, the reaction mixture is rendered alkaline by the addition of a concentrated sodium hydroxide solution, the separated oil is taken up in about 3 litres ether, separated and washed with a concentrated sodium chloride solution. After concentration of the ether solution to about 500 ml., crystallisation starts.

1st crystallisate: 23.8 g., m.p. 126° – 142°C.

From the mother liquor after further concentration:
2nd crystallisate: 13.0 g., m.p. 118° – 121°C.

Residual mother liquor evaporated, residue distilled:
a. b.p. 95° – 120°C./9 mm.Hg.; 8.1 g. starting amine;
b. b.p. 135° – 150°C./1.4 mm.Hg.; 38.2 g.; 140°to a soft, crystalline mass.

Total yield: 75 g., i.e. 87.5% of theory, referred to the reacted amine.

The crystallisates are mixtures of the α- and β-stereomers of 3-methyl-4-phenyl-4-hydroxy-piperidine, which can be separated by fractional crystallisation from ether: α-compound: m.p. 125° – 126°C.; β-compound: m.p. 150° – 151°C.

C$_{12}$H$_{17}$NO (191); (m.p. 150°–151°):
Calc.: C 75.40; H 8.90; N 7.34.
Found: C 75.30; H 8.95; N 7.29.

N-methyl derivative of the α-compound: m.p. 78° – 80°C.

C$_{13}$H$_{19}$NO (205):
Calc.: C 76.05; H 9.33; N 6.82.
Found: C 76.15; H 9.36; N 7.08.

When working is carried out in 1 molar solution by heating 16.1 g. (0.1 mol) 3-phenyl-Δ$^{3,4}$-pentenylamine, 16.2 ml. 6.5 1N hydrochloric acid, 78 ml. water and 11 g. 30% formalin solution for about 50 hours, there are isolated:

a. 4.2 g., m.p. 153°C.; β-3-methyl-4-phenyl-4-hydroxy-piperidine
b. 8.2 g., b.p. 135°C/1.5 mm.Hg.; solidifies with ether; mixture of the stereomers, besides 2.2 g. of starting amine.

Yield 75% of theory, referred to the reacted amine.

When the same reaction mixture is heated for only one hour, there are obtained:

a. 2.8 g., m.p. 152° – 153°C.; β-compound
b. b.p. 130°C/0.8 mm.Hg.; 11.2 g.; crystallises upon treatment with ether; in addition 2.3 g. starting amine.

Yield 82.4% of theory, referred to the reacted amine.

When an analogous 0.1 mol reaction mixture is allowed to stand for 39 days at room temperature in an 0.1 molar solution (16.1 g. 3-phenyl-Δ$^{3,4}$-pentenylamine, 105 ml. 1N hydrochloric acid, 10 g. formalin solution, 900 ml. water there are obtained:

a. 5.3 g., m.p. 122° – 125°C.; α-compound
b. 7.0 g., b.p. 124°C./0.4 mm.Hg.; solidifies with ether, in addition 1.2 g. starting amine.

Yield: 70.3% of theory, referred to the reacted amine.

EXAMPLE 3

3-methyl-4-(p-methoxyphenyl)-4-hydroxy-piperidine a. 62 g. (0.331 mol) 3-(p-methoxyphenyl)-Δ$^{3,4}$-pentenonitrile (prepared from 4-methoxypropiophenone and cyanoacetic acid, b.p. 168° – 175°C./12 mm.Hg.) in 500 ml. methanol are mixed with 10 g. Raney cobalt and 10 ml. 0.1 M ferrous sulphate solution and hydrogenated under pressure at 60° – 70°C. After separation of the catalyst, the solution is treated with active charcoal and concentrated in a vacuum. The residue is distributed between 200 ml. 2N hydrochloric acid and benzene, the aqueous phase separated and rendered alkaline, while cooling, with a concentrated sodium hydroxide solution. The liberated amine is taken up in ether, the extracts dried over potassium carbonate and, after removal of the ether, the residue distilled at water jet pump pressure. The fraction distilling over between 148° and 154°C./12 mm.Hg. consists of 3-(p-methoxyphenyl)-Δ$^{3,4}$-pentenylamine.

b. 59 g. (0.309 mol) 3-(p-methoxyphenyl)-Δ$^{3,4}$-pentenylamine are dissolved in 265 ml. 1.27N hydrochloric acid and 2700 ml. water (pH 3.0 – 3.5) and mixed with 30.9 g. (0.309 mol) 30% formalin solution. The reaction mixture is stirred for 78 hours at 80° – 90°C., the neutral parts are removed from the cooled reaction mixture with benzene, the aqueous-acidic solution is clarified with activated charcoal, covered with ether and, while cooling, rendered alkaline with an excess potassium carbonate solution. After separating the organic phase, extraction is carried out three times with ether, the combined extracts are dried over potassium carbonate and the ether is removed in a vacuum. The residue is recrystallised from ethyl acetate. Melting point of the 3-methyl-4-(p-methoxyphenyl)-4-hydroxy-piperidine: 138° – 141°C.; 15 g.

C$_{13}$H$_{19}$NO$_2$ (221,3):
Calc.: N 6.3.
Found: N 6.42.

After evaporation of the ethyl acetate mother liquor and distillation of the oily residue, there are obtained 10 g. of a crystallising oil of b.p. 120° – 126°C./0.05 mm.Hg., which is a stereomer mixture.

EXAMPLE 4

N,3-dimethyl-4-phenyl-4-hydroxy-piperidine 52.8 g. (0.337 mol) of the 3-phenyl-Δ$^{3,4}$-pentenylamine obtained according to Example 2(a) are dissolved in 345 ml. 1N hydrochloric acid, diluted with 1050 ml. water and, after the addition of 360 g. (3.6 mol) 30% formalin solution, heated at 80° – 90°C. for about 18 hours; pH: 3 – 4. After cooling, the reaction mixture is rendered alkaline with a 50% potassium carbonate solution and the separated oily base taken up with ether. The residue of the ether solution is dissolved in 200 ml. methanol, the solution mixed with 36.2 g. formalin solution and 3.1 ml. glacial acetic acid and, after the addition of 10 g. Raney nickel, hydrogenated at 50° – 60°C. and 50 atmospheres pressure of hydrogen. When the hydrogen absorption is completed, the catalyst is separated, the methanol removed in a vacuum, the residue mixed with water and some potassium carbonate solution, the base taken up with ether and, after evaporation of the ether, distilled; the so obtained N,3-dimethyl-4-phenyl-4-hydroxy-piperidine boils at 125°C./1.5 mm.Hg. to give a rapidly solidifying oil. Yield 40 g., i.e. 58% of theory. After recrystallisation from methyl-cyclohexane; m.p. 116° – 118°C. (β-compound).

C$_{13}$H$_{19}$NO (205):
Calc.: N 6.82;
Found: N 6.87.

EXAMPLE 5

2-(p-methoxybenzyl)-4-isopropyl-4-hydroxy-piperidine a. 177 g. (1.62 mol) β-isopropyl-allyl cyanide (obtained by condensation of methyl isopropyl ketone with cyanoacetic acid; b.p. 62 – 64°C./14 mm.Hg.) are dissolved in 700 ml. methanol and, after the addition of 20 g. Raney cobalt and 20 ml. ferrous sulphate solution, hydrogenated for 2 hours at 70°C. After cooling, the catalyst is filtered off with suction, the filtrate clarified with charcoal, filtered and the solvent distilled off at atmospheric pressure. The residue is distilled through a column, whereby the resultant mixture of 3-isopropyl-Δ$^{3,4}$-butenylamine, 3,4-dimethyl-Δ$^{3,4}$-pentenylamine and 3,4-dimethylpentylamine distils over as a colourless liquid at 142° – 146°C./760 mm.Hg.

b. 100 g. (0.885 mol) of the mixture obtained according to (a) are dissolved in 840 ml. 1.15N hydrochloric acid and 4 litres water (pH 3 – 4). After the addition of 184 g. (0.885 mol) p-methoxyphenyl-glycidic acid methyl ester, the mixture is stirred for 64 hours at 80°C. After allowing to cool, the aqueous acidic solution is decanted off from the smeary material adhering to the wall of the flask, treated with activated charcoal, filtered and rendered alkaline with excess potassium carbonate solution. After shaking out with ether several times, the extracts are dried over potassium carbonate and concentrated in a vacuum. The 2-(p-methoxybenzyl)-4-isopropyl-4-hydroxy-piperidine thereby crystallises out. After recrystallising from acetone, the melting point is 140° – 142°C.

$C_{16} H_{25} NO_2$ (263.4):

Calc.: N 5.32; O 12.15.

Found: N 5.31; O 12.16.

When the p-methoxy-phenylglycidic acid methyl ester is replaced by an equimolar amount of benzaldehyde and the procedure is otherwise the same as that described under (b), there is obtained the 2-phenyl-4-isopropyl-4-hydroxy-piperidine of m.p. 138° – 140°C.

$C_{14} H_{21} NO$ (219):

Calc.: C 76.67; H 9.65; N 6.38.

Found: C 76.75; H 9.52; N 6.35.

EXAMPLE 6

2-(p-methoxybenzyl)-4-isobutyl-4-hydroxy-piperidine a. 150 g. (1.2 mol) of a mixture of 3,5-dimethyl-$\Delta^{2,3}$-hexenonitrile, 3,5-dimethyl-$\Delta^{3,4}$-hexenonitrile and β-isobutylallyl cyanide (obtained by the condensation of methyl isobutyl ketone with cyanoacetic acid; b.p. 73° – 75°C./14 mm.Hg.) are dissolved in 500 ml. methanol, mixed with 15 g. Raney cobalt and 15 ml. 0.1 M ferrous sulphate solution, and hydrogenated at 70° – 80°C. When the reaction mixture is cold, the catalyst is filtered off with suction, the filtrate decolorised with charcoal, the methanol removed at atmospheric pressure and the residue distilled in a vacuum. Boiling point of the amine mixture of 3,5-dimethyl-hexylamine, 3,5-dimethyl-$\Delta^{3,4}$-hexenylamine and 3-isobutyl-$\Delta^{3,4}$-butenylamine 53° – 58°C./15 mm. Hg.

b. 80 g. (0.625 mol) of the amine mixture obtained according to (a), 520 ml. 1.3N hydrochloric acid, 3 litres water (pH of the solution 3 – 4) and 130 g. (0.625 mol) p-methoxyphenyl-glycidic acid methyl ester are stirred for 64 hours at 80°C. The cooled solution is decanted, treated with activated charcoal, filtered and rendered alkaline with excess potassium carbonate solution. The liberated base is taken up in ether, the ethereal solution dried over potassium carbonate and evaporated in a vacuum. By vacuum distillation there is obtained from the residue the 2-(p-methoxybenzyl)-4-isobutyl-4-hydroxy-piperidine; b.p. 170° – 180°C./0.3 mm.Hg.; m.p. 120° – 122°C.

$C_{17} H_{27} NO_2$ (277.4):

Calc.: C 73.6; H 9.73; N 5.05.

Found: C 73.9; H 9.62; N 5.04.

When, in the above Example, the p-methoxyphenylglycidic acid methyl ester is replaced by an equimolar amount of benzaldehyde and the procedure is otherwise the same as that described under (b), there is obtained the 2-phenyl-4-isobutyl-4-hydroxy-piperidine of m.p. 109° – 111°C.

$C_{15} H_{23} NO$ (233):

Calc.: C 77.20; H 9.94; N 6.01.

Found: C 77.46; H 9.91; N 5.98.

EXAMPLE 7

2-(p-methoxybenzyl)-3-phenyl-4-methyl-4-hydroxy-piperidine a. 100 g. (0.636 mol) of a mixture of 3-methyl-4-phenyl-$\Delta^{2,3}$-butenonitrile and 3-methyl-4-phenyl-$\Delta^{3,4}$-butenonitrile (obtained by condensation of phenylacetone with cyanoacetic acid; b.p. 143° – 146°C./14 mm.Hg.) in 500 ml. methanol, are, after the addition of 12 g. Raney cobalt and 10 ml. 0.1M ferrous sulphate solution, hydrogenated for 2 hours at 70°C. After removal of the catalyst, the methanol is distilled off in a vacuum and the residue distilled in a vacuum. The 3-methyl-4-phenyl-butenylamine boils between 126° and 136°C. at a pressure of 15 mm.Hg.

b. A mixture of 84 g. (0.4 mol) p-methoxyphenylglycidic acid methyl ester, 64.5 g. (0.4 mol) 3-methyl-4-phenyl-butenylamine, 360 ml. 1.2N hydrochloric acid and 2 litres water (pH of the solution 3 -4) is stirred for 84 hours at 80°C. The aqueous solution is decanted, treated with activated charcoal, filtered, rendered alkaline with a potassium carbonate solution and extracted several times with ether. The combined extracts are dried over potassium carbonate and evaporated in a vacuum. By vacuum distillation of the residue, there is obtained the 2-(p-methoxybenzyl)-3-phenyl-4-methyl-4-hydroxy-piperidine; b.p. 182° – 192°C./0.1 mm.Hg.; m.p. 137° – 139°C.

$C_{20} H_{25} NO_2$ (311.4): Calc.: N 4.50. Found: N 4.69.

EXAMPLE 8

2,3-dimethyl-4-phenyl-4-hydroxy-piperidine 80.5 g. (0.5 mol) of the 3-phenyl-$\Delta^{3,4}$-pentenylamine obtained according to Example 2(a) are dissolved in 525 ml. 1N hydrochloric acid, diluted with 2000 ml. water and, after the addition of 24.2 g. freshly distilled acetaldehyde (0.55 mol), stirred for 40 hours at 80° – 90°C., pH of the solution: 3 – 4. After cooling, the reaction mixture is rendered alkaline by the addition of a concentrated sodium hydroxide solution, the solution covered with ether and, after mixing at the separating layer, the reaction product separates in crystalline form. After standing, the crystals are filtered off with suction, washed with water and some ether and there is thus obtained a first crystallisate of 22.3 g.; m.p. 170° – 171°C. The residual lye is shaken out several times with ether, and from the combined ether extracts there are obtained an additional 3.8 g.; m.p. 169° – 171°C. After recrystallisation from dilute methanol, the 2,3-dimethyl-4-phenyl-4-hydroxy-piperidine obtained has a m.p. of 172° – 173°C.

$C_{13} H_{19} NO$ (205):

Calc.: C 76.05; H 9.33; N 6.82.

Found: C 76.00; H 9.36; N 6.78.

Upon concentration of the ether solutions, an oil is obtained, which is fractionally distilled; besides 13.7 g. of starting base, there are obtained 35 g. of a viscous oil of b.p. 125° – 127°C./0.9 mm.Hg., which crystallises upon trituration with a little ether. Yield: 71.8% of theory, referred to the reacted starting amine.

EXAMPLE 9

N,3-dimethyl-4-phenyl-4-hydroxy-piperidine 34.9 g. (0.2 mol) N-methyl-3-phenyl-$\Delta^{3,4}$-pentenylamine (produced by the N-monomethylation of the 3-phenyl-$^{3,4}$-pentenylamine obtained according to Example 2(a); b.p. 108° – 110°C./15 mm.Hg.) are dissolved in 214 ml. 1N hydrochloric acid, diluted with 780 ml. water and, after the addition of 21.9 g. 30% formalin solution, stirred for 40 hours at 80° – 90°C.; pH of the solution ≈3.0. After cooling, the solution is rendered alkaline with a sodium hydroxide solution, the base which separates is taken up with ether, separated and the ether evaporated. The solid residue obtained is recrystallised from methyl-cyclohexane, and thus 17.4 g. of the β-form of N,3-dimethyl-4-phenyl-4-hydroxy-piperidine of m.p. 117° – 118°C. are obtained (cf. Example 4). After evaporation of the solvent there is obtained from the methyl cyclohexane mother liquor an oil from which, besides 2 g. of starting material, 10.4 g. of a stereometric mixture of b.p. 119° – 121°C./1.0 mm.Hg. are obtained by distillation. From this mixture there can be separated, upon treatment with petroleum ether, a further 1.9 g. of the β-compound of m.p. 117°–118°C. Yield 27.4 g. i.e. 71% of theory. Content of the β-derivative in the stereomeric mixture: 70%.

EXAMPLE 10

2-isopropyl-3-methyl-4-phenyl-4-hydroxy-piperidine 60.4 g. (0.375 mol) 3-phenyl-$\Delta^{3,4}$-pentenylamine, produced according to Example 2(a), are dissolved in 1800 ml. water by the addition of 60.7 ml. (0.395 mol) 6.5N hydrochloric acid and, after the addition of 33 g. (0.458 mol) freshly distilled isobutyraldehyde, heated at 80° – 90°C. for 144 hours. The pH of the solution is 3.0. After cooling and mixing with some ether, the clear solution obtained is rendered alkaline by the addition of a sodium hydroxide solution, whereby reaction product separates in crystalline form. After filtering off with suction, washing with water and some ether, a first crystallisate of 10.2 g., m.p. 156° – 157°C. is obtained. Upon evaporation of the ether solution and by shaking out the alkaline solution with ether, a second crystallisate of 2 g., m.p. 157°C., is obtained. By distillation of the residue of the ether solution, there is obtained, besides 27.2 g. of unreacted starting base, a stereomeric mixture (15.2 g.) boiling at 124° – 129°C./0.4 mm.Hg. from which, by treatment with ether, a further 2.0 g. of the stereomer of m.p. 157°C. can be separated. Yield 27.4 g. of 2-isopropyl-3-methyl-4-phenyl-4-hydroxy-piperidine, i.e. 56.8% of theory, referred to the reacted base. The reaction product consists of at least 51% of the stereomer of m.p. 157°C.

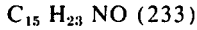

$C_{15}H_{23}NO$ (233)

N Calc.: 6.01, Found 6.18.

N-methyl derivative m.p. 103°–104°

$C_{16}H_{25}NO$ (247):

Calc.: C 77.68; H 10.18; N 5.67.

Found: C 78.00; H 10.02; N 5.69.

The novel process for the production of 6,7-benzomorphanes thus represents a significant and important technical advance in this art.

The cyclization of the derivatives of N-alkyl-2-benzyl-4-hydroxypiperidines is carried out by boiling with 48 percent hydrobromic acid for 6 to 24 hours or by prolonged heating at 120° to 160° C. with concentrated phosphoric acid; during this operation additional changes may occur among the substituents, such as hydrolysis of methoxy and/or acylamino groups.

The 6,7-benzomorphanes are obtained in racemic form which may be resolved into optically active isomers by a method known per se. When they are monosubstituted at the 5-position, a trans-form analogous to the isomorphinanes is produced in addition to the cis-form analogous to morphine, though the former is usually only obtained at a low yield.

The alkyl substituents of the derivatives of N-alkyl-2-benzyl-4-hydroxy-piperidines (1) may be straight chain or branched, saturated or unsaturated, while aryl substituents may contain one or more additional alkyl groups, halogen, alkoxy, hydroxyl or substituted amino groups, and such substituents may be the same or different in the case of multiple substitution.

EXAMPLE 11

2,5,9-Trimethyl-2'-hydroxy-6,7-benzomorphan 29.6 g (0.112 moles) of 1,3,4-trimethyl-4-hydroxy-2-(4'-methoxybenzyl)-piperidine are heated to boiling under reflux for 6 hours in 300 ml of hydrobromic acid (density 1.49). The solution is thereafter evaporated in vacuo, the viscous residue is dissolved in 100 ml of methanol, and this solution is stirred into 500 ml of water. This layer is covered in a separating funnel with 600–700 ml of a 1:1 benzene/butanol mixture, it is gradually rendered alkaline by the addition of dilute ammonium hydroxide solution and the voluminous base which separates is dissolved in the benzene/butanol layer by shaking vigorously. This is separated and washed with a saturated solution of sodium chloride, and the benzene/butanol phase is evaporated in vacuo. The residue which solidifies in the form of crystals is brought to the boil with a little methanol, filtered off with suction after it has cooled down, and recrystallized from methanol. Yield 16.1 g; m.p. 228°–230° C.

$C_{15}H_{21}NO$ (231.0) Calc.: C 77.89%; H 9.15%; N 6.05%.

Found: C 78.04%; H 9.24%; N 6.00%.

When a little absolute alcohol is poured over 10.7 g of the 2,5,9-trimethyl-2'-hydroxy-6,7-benzomorphan thus obtained and an alcoholic solution of hydrogen chloride is added, a clear solution is obtained on heating, and cooling and the addition of some ether to it causes the crystallization of 10.7 g of the hydrochloride of the α-form of m.p. 195°–196° C. Concentration of the mother liquor and treatment with ether produces 0.2 g of the hydrochloride of the β-form, of m.p. 254°–256° C.

EXAMPLE 12

9-Ethyl-2'-hydroxy-2,5-dimethyl-6,7-benzomorphan 7.0 g (0.025 moles) of 3-ethyl-4-hydroxy-2-(4'-methoxybenzyl)-1,4-dimethyl-piperidine are dissolved in 70 ml of hydrobromic acid (density 1.49) and boiled under reflux for 15 hours. It is left to cool, treated with animal charcoal and filtered, and the solution is concentrated in a rotary evaporator. The residue is taken up in water and rendered weakly alkaline with ammonium hydroxide, whereupon 9-ethyl-2'-hydroxy-2,5-dimethyl-6,7-benzomorphan separates in the form of a solid precipitate. It is filtered off with suction, washed with water and recrystallized from aqueous methanol. Melting point 203°–206° C.

$C_{16}H_{23}NO$ (245.4) Calc.: C 78.32%; H 9.45%; N 5.71%.

Found: C 78.36%; H 9.33%; N 5.61%.

EXAMPLE 13

5-Ethyl-2'-hydroxy-2,9-dimethyl-6,7-benzomorphan 16.0 g (0.058 moles) of 4-ethyl-4-hydroxy-2-(4'-methoxybenzyl)-1,3-dimethyl-piperidine are boiled under reflux for 15 hours in 160 ml of hydrobromic acid (density 1.49). The cooled solution is treated with animal charcoal, and when filtered it is concentrated in a rotary evaporator, the residue taken up in water and rendered weakly alkaline with ammonium hydroxide. The precipitated 5-ethyl-2'-hydroxy-2,9-dimethyl-6,7-benzomorphan is filtered off with suction, washed with water and recrystallized from methanol. Melting point 248°–249° C.

$C_{16}H_{23}NO$ (245.4) Calc.: C 78.32%; H 9.45%; N 5.71%.

Found: C 78.42%; H 9.43%; N 5.70%.

EXAMPLE 14

2-Methyl-5-n-propyl-9-ethyl-2'-hydroxy-6,7-benzomorphan 2.7 g (0.0089 moles) of N-methyl-2-(4'-methoxybenzyl)-3-ethyl-4-n-propyl-4-hydroxypiperidine are boiled under reflux for 6 hours with 30 ml of hydrobromic acid (density 1.49). The resultant solution is evaporated in vacuo, the residue is dissolved in a little methanol, this solution is stirred into water, the base is liberated with dilute ammonium hydroxide solution and taken up in ether. Evaporation of the ether produces a partly crystalline residue, which is repeatedly recrystallized from dilute methanol. The 2-methyl-5-n-propyl-9-ethyl-2'-hydroxy-6,7-benzomorphan thus obtained melts at 215°–216° C. after sintering; yield 1.7 g.

$C_{18}H_{27}NO$ (273) Calc.: C 79.10%; H 9.90%; N 5.13%.

Found: C 79.34%; H 9.83%; N 5.14%.

EXAMPLE 15

2,9-Dimethyl-5-phenyl-2'-hydroxy-6,7-benzomorphan 8.5 g (0.026 moles) of 1,3-dimethyl-2-(4'-methoxybenzyl)-4-phenyl-4-hydroxypiperidine are boiled under reflux for 6 hours in 30 ml of hydrobromic acid (density 1.49). It is evaporated in vacuo, the residue is dissolved in methanol, stirred into water rendered alkaline with dilute ammonium hydroxide solution, and the separated base is taken up in much ether. After evaporation of the ether, a crystalline residue is obtained which melts at 157°–168° C. after being recrystallized from dilute acetone and then from dilute methanol. The 2,9-dimethyl-5-phenyl-2'-hydroxy-6,7-benzomorphan thus obtained consists of a mixture of the two diastereomeric forms.

$C_{20}H_{23}NO$ (293) Calc.: C 81.87%; H 7.90%; N 4.75%.

Found: C 81.47%; H 8.03%; N 4.58%.
HCl salt: m.p. 160°–170° C. (mixture).

What is claimed is:

1. A process for the production of benzomorphan derivatives of the formula:

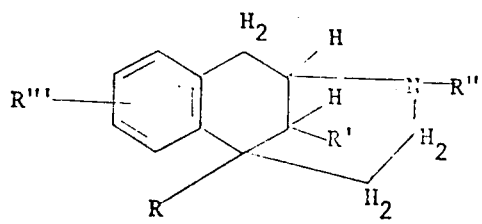

wherein
R is lower alkyl, aryl or aralkyl,
R' is hydrogen, lower alkyl, aryl or aralkyl,
R'' is lower alkyl, and
R''' is hydrogen, or lower alkoxy.
which comprises cyclizing in the presence of a strong acid a compound of the formula:

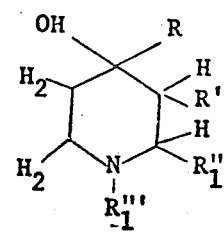

wherein
R is lower alkyl, aryl or aralkyl,
R' is hydrogen, lower alkyl, aryl or aralkyl,
$R_1''$ is benzyl or lower alkoxy benzyl, and
$R_1'''$ is lower alkyl,
and recovering the cyclized product.

* * * * *